Patented June 15, 1954

2,681,307

UNITED STATES PATENT OFFICE 2,681,307

PROCESS FOR USING THIONYL CHLORIDE FOR DRYING MUSTARD GAS

Linton E. Simerl, United States Army, assignor to the United States of America as represented by the Secretary of War No Drawing. Application May 30, 1945, Serial No. 596,719

1 Claim. (Cl. 202—57)

(Granted under Title 35, U. S. Code (1952), sec. 266)

The invention described herein may be manufactured and used by or for the Government, for governmental purposes, without the payment to me of any royalty thereon.

This invention relates to the process of drying chemical materials by means of liquid dehydrating agents. Particularly, this invention pertains to the drying of water-washed mustard gas.

Copending application Serial No. 582,820 filed March 14, 1945, and assigned to the assignee of this application, describes processes of purifying mustard gas produced by the Levinstein process.

Broadly, the object of this invention is to provide a process for drying mustard gas with an agent in liquid state.

A more specific object of this invention is to provide a method of drying water-washed Levinstein mustard gas with thionyl chloride.

A partial elimination of water before the vacuum distillation has been achieved by blowing dry air under vacuum. However, in cases where water present has to be removed substantially completely other methods have been employed.

One of these involved the passing of mustard gas through a tower packed with flakes of caustic or silica gel.

However, since the results were unpredictable and in some cases there were evidences of reaction between the mustard gas and the drying agent these methods, although accepted commercially, were not universally adopted.

In addition, the necessary frequent recharging and disposal of the spent drying agent, being very laborious and extremely dangerous, added appreciably to the disadvantages already stated.

The present invention relates to a liquid drying agent, which can be added to the mustard gas after it has been water-washed and separated from the water layer.

The liquid agent used is thionyl chloride, having the formula $SOCl_2$.

As the preferred embodiment of my invention, the thionyl chloride is used because of simplicity of handling, its easy availability and relatively low cost.

The improved process consists in adding the thionyl chloride from an iron storage tank through an iron pipeline in a slight excess of the theoretical quantity required to react with water present in the mustard gas, which is determined in the manner well known in the chemical art.

The thionyl chloride being miscible and non-reactive with the mustard gas reacts with all of the water present producing gaseous end products ($SO_2$ and $HCl$), which are evolved as non-condensables in the subsequent vacuum distillation of mustard gas, or they may remain in the residue as stable, inert materials.

The final product after distillation is free from water, non-condensable gases, and pressure producing compounds. The product is also pressure stable to heat.

Since a number of specific changes may be made in practicing this invention, it is intended that all material contained in the above description shall be interpreted as illustrative and not in a limiting sense.

I claim:

A process of drying a predetermined quantity of water-washed mustard gas, that includes the following steps: storing a supply of thionyl chloride in an iron container; conducting said thionyl chloride through an iron conduit into said mustard gas in an amount in excess of the theoretical quantity required to react with the amount of water present in said mustard gas; permitting said thionyl chloride to react with all of said water present in said mustard gas to produce gaseous end products including sulphur dioxide and hydrochloric acid; and subsequently distilling the thus treated mustard gas in vacuo until said mustard gas is obtained in a dry condition.

References Cited in the file of this patent

FOREIGN PATENTS

| Number | Country | Date |
|---|---|---|
| 142,875 | Great Britain | June 10, 1920 |

OTHER REFERENCES

Chemical Abstracts, 1920, volume 14, 3419[3] Div. 6 or U. S. Patent Office Scientific Library. Wilhelm Steinkapf, Julius Herald, and Joseph Stokr, Kaiser-Wilhelm Inst. Physik Chem. Elektro Chem. Berlin—Dahlem & Techn. Hochschule Dresden, Ber. 53–B, 1007–12 (1920).

Chemical Abstracts 1921, volume 15, 2881[6] Delephine, Fleury and Ville Compt. Rend. 172, 1238–40. Div. 6 and U. S. P. O. Scientific Library.